Figure 1:
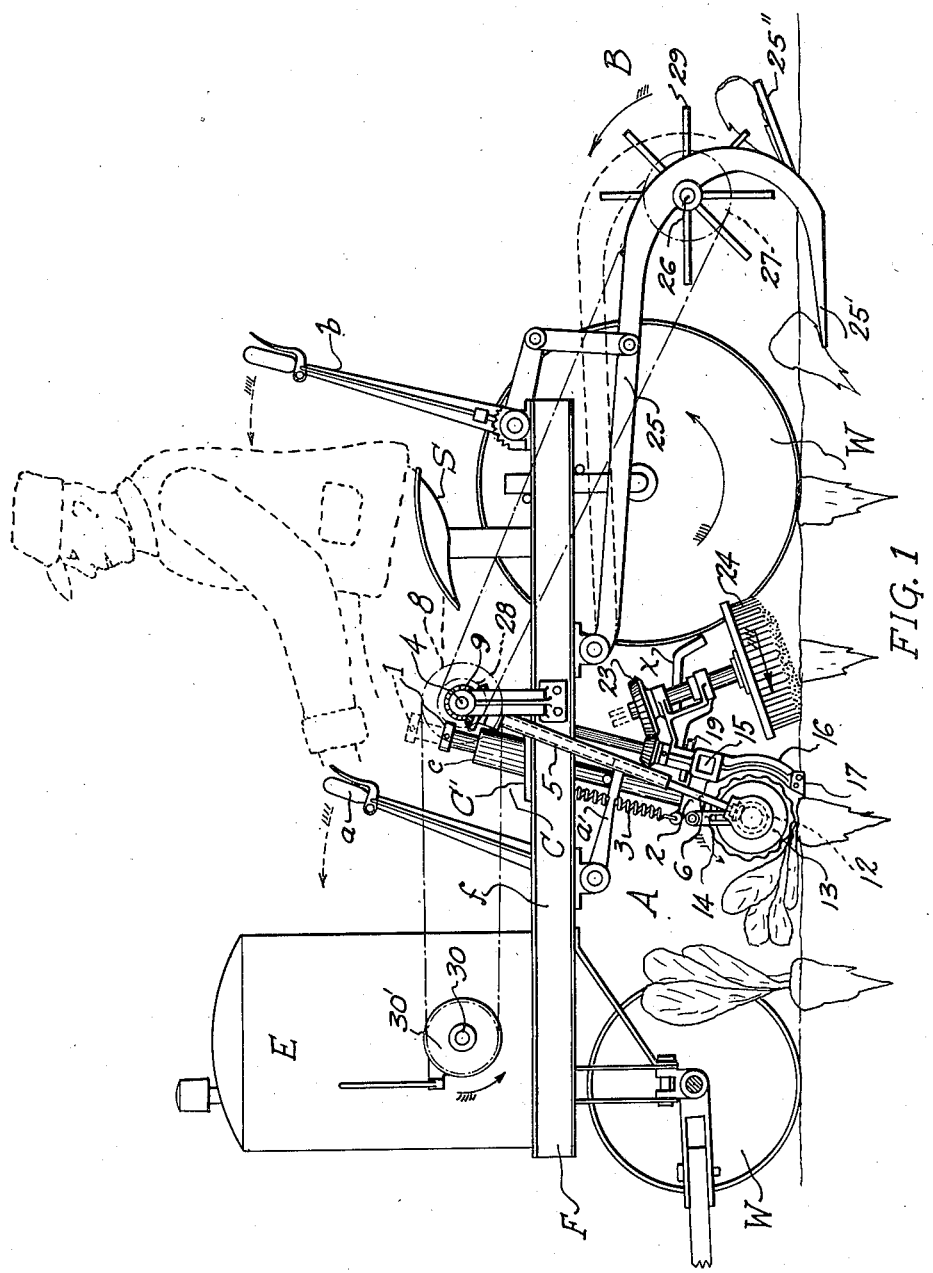

May 28, 1929.    S. F. PARKER    1,714,617
BEET TOPPING MACHINE
Filed Nov. 5, 1926    4 Sheets-Sheet 2

INVENTOR
STANLEY F. PARKER
BY
ATTORNEY

INVENTOR.
STANLEY F. PARKER
BY
ATTORNEY.

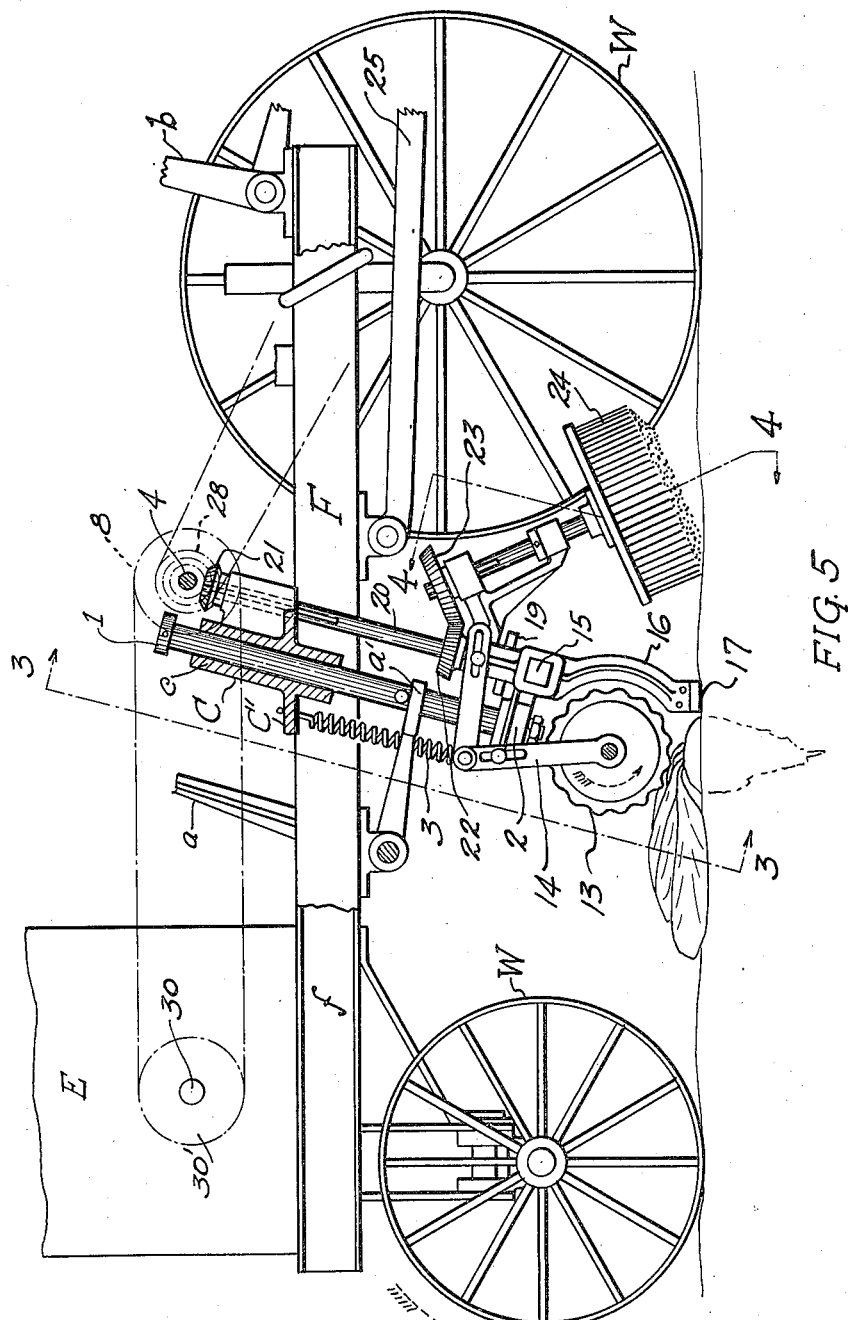

Patented May 28, 1929.

1,714,617

UNITED STATES PATENT OFFICE.

STANLEY F. PARKER, OF MILWAUKEE, WISCONSIN, ASSIGNOR, BY MESNE ASSIGNMENTS, TO HUGO LOEWENBACH, OF MILWAUKEE, WISCONSIN.

BEET-TOPPING MACHINE.

Application filed November 5, 1926. Serial No. 146,501.

This invention provides the simplified construction of a beet-topping machine, which operates as a harvesting device that will perform all the functions in the field for preparing the beets, while harvesting same, to comply with a condition required by the refinery, where the beets are sent through the final processes necessary to the manufacture of sugar; thereby eliminating the irregular and unsatisfactory manual labor heretofore relied upon.

The invention embraces a framework upon which is located a power source, or motor, and depended from which are arranged the harvesting implements positioned longitudinally of the particular row being reaped, as the device is drawn forward by any adaptable means of propulsion; the said power source being employed solely for operating the installed mechanism geared thereto.

One feature involved is a forward roller means that affects the horizontal operative plane of a cutting assembly which dispenses with an advanced leaf-clipping means while arranging said leaves so that the beet-root is presented to a cutting blade which eliminates the leaf-removing consideration, by a novel step that severs the beet-top below the said leaves in the form of a cap that retains the leaves of each but as a removed unit.

Another feature is, a revolving brush, operating in a transverse plane that is noticeably at an angle to the horizontal, with its inclination pitched in a rearwardly direction. This brush throws aside all the cut units severed by the mechanism that immediately precedes it, leaving the row clear of all refuse that may otherwise become entangled in the following traction wheels of the machine. The above mentioned roller and cutting means forms a geared forward group that also supports and operatively includes the following brush member.

Another feature embraces a plow attachment which unearths the embedded beets that have been previously topped in a manner that a minimum of soil is turned over, which precaution leaves the beet-root within the reach of a rotating wheel whose free spokes kick the beet out to where the same lies on top of the soil for easy gathering.

Still another feature is, the novel gearing which permits of arranging the cutting and sweeping means at a certain angle to the machine's major horizontal plane. This gearing installation allows a reciprocating movement of a cutting blade transversely of the beet-row and vertically changeable over same; a similar vertical action in a transverse roller that is gear driven; a centrally positioned brush element revolving at a rate sufficient to remove the clipped products from the path of travel; and means supplied for transmitting the power required for the spoked "throwout," that forms the final rearward element in this invention.

Adjustment provisions and other incidentals necessary to a machine of this class will be remarked in the detailed description here following; and applicant desires to remark that he may, through the process of developing his device, adapt such changes as appear serviceable, without abandoning the spirit of the invention, as above outlined, as specifically described, as disclosed in the drawings, and as pointed out in the appended claims.

Figure 2:
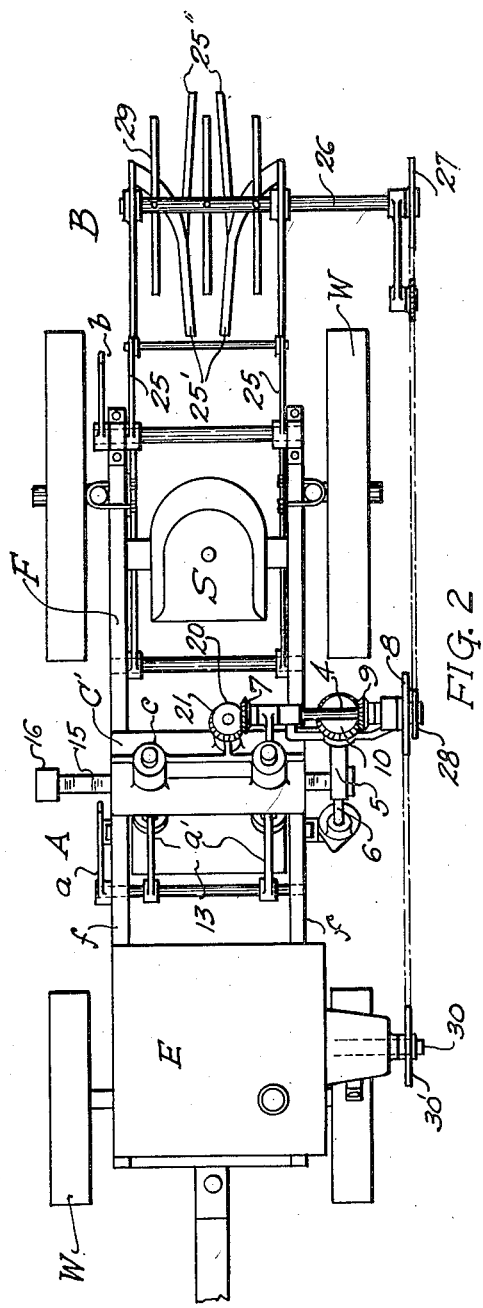
Figure 3:
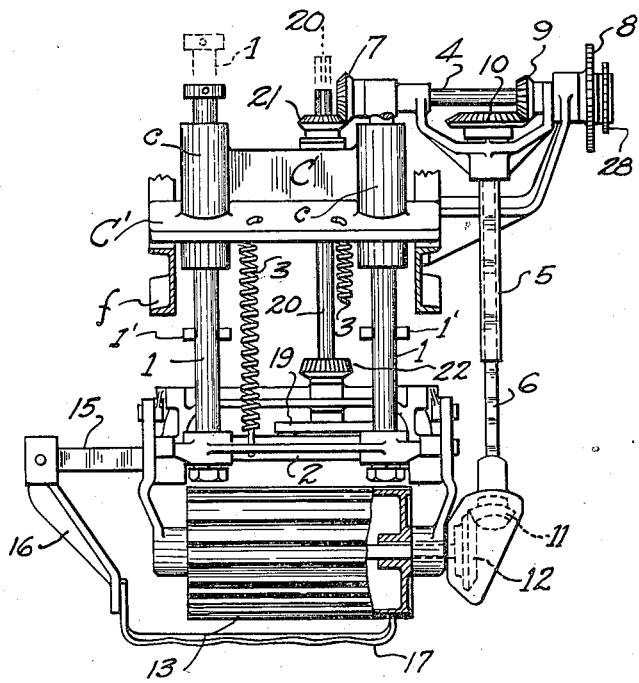
Figure 4:
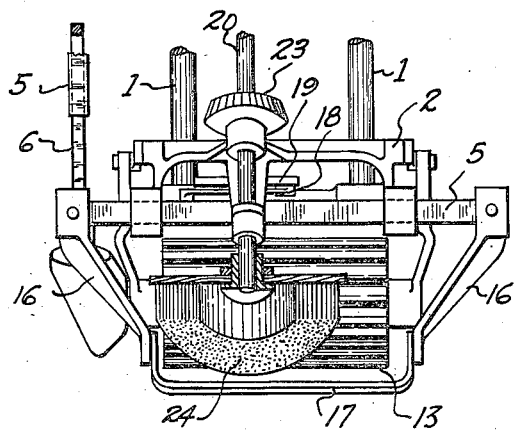

Fig. 1 is a side elevation of the complete machine, near wheels removed.
Fig. 2 is a plan view of Fig. 1.
Fig. 3 is a section on line 3—3 of Fig. 5.
Fig. 4 is a section on line 4—4 of Fig. 5.
Fig. 5 is an enlarged fragmentary side elevation, partly in section.
Fig. 6 is a detail of the cutting unit.
Fig. 7 is a detail of roller and cutter relationship.
Fig. 8 is a section on line 8—8 of Fig. 6.

Similar characters of reference apply to like parts throughout the several views.

A framework F is portably supported by traction wheels W, and adapted to be horse, or tractor drawn by some suitable hitching means at the forward end of said framework whereon is mounted a motor unit, or, gas-engine E supplying the power necessary for operating the mechanical assemblies supported by the framework aforesaid. The assemblies comprise a forward group A, including a medially positioned brush; and a rearward assembly B, including a plow and a throwout means. The group A and assembly B have their positions, relative to the ground, controlled by a leverage means, respectively $a$ and $b$, arranged near the operator's seat S. Suitable chain, or belt drive is applied for conveying the engine's power to operate the group A aforesaid, and the throwout of the assembly B. The said group A is resiliently depended from the framework F and is vertically reciprocatable by virtue of a transverse guiding member or frame-stabilizing casting C which, in union with other structural appurtenances, maintains the frame's side bars $f$ in stress-resisting parallel relationship. The said casting C is fashioned to offer inclined sleeve bearings $c$—$c$ in which slide the similarly inclined shaft-like stems 1—1, rigidly part of a low positioned casting 2, that is supported in a floating manner by the springs 3—3 whose dead ends are attached to the plate C' of aforesaid casting C in any adjustable way that will permit of securing the correct location of the parts, with respect to the ground, for the cutting position. The casting C extends outwardly from the framework to provide bearing journals for an upper transverse shaft 4, and a vertically inclined sleeve-shaft 5 which envelops a slidable shaft 6. The shaft 4 has a mitre gear 7 keyed to its inner terminus, and a sprocket 8 similarly fixed to its outer terminus; this shaft 4 also has an intermediate mitre gear 9 that meshes with a similar gear 10 keyed to revolve with the sleeve-shaft 5, which sleeve is splined to rotate the shaft 6 that carries a bevel gear 11 fixed to its lower terminus in mesh with a companion gear 12 forming a part of the corrugated roller 13 and imparting rotation to same. The said roller is adjustably mounted by means of the slotted toggle 14 for getting a determined relationship between itself and the cutting blade, to be presently described.

The cutting means forms a parallelogram structure that reciprocates transversely of the machine and the beet-row being harvested. It comprises a square shaft 15 that is mounted to slide in squared bearings fashioned as part of the lower suspended casting 2. Legs 16 depend in a determined direction for receiving the cutting blade 17, which blade is ground to form the cross-section seen in Fig. 8. This parallelogram unit rises and falls with the vertically reciprocating casting 2. Action is imparted by a connecting rod 18 that is pivotally attached to the shaft 15 and rotating disc 19, which latter is rigidly part of a vertical shaft 20 that is splined to slip through a bevel pinion 21 when a vertical rise or lowering of the casting 2 is occasioned. The shaft 20 is rotated by virtue of the pinion 21 being in mesh with the gear 7 previously described. The shaft 20 also accommodates a pinion 22 fixedly positioned to said shaft and continuously in mesh with a bevel gear 23 located above a rearwardly extending bearing arm of the casting 2, for journalling a stub shaft on one end of which is keyed the said gear 23 and which also carries, to revolve with it, the inclinedly positioned brush 24, this latter element is adapted to be lifted away from the ground along with the other elements supported by the casting 2, viz: roller means and parallelogram assembly aforesaid. The operating lever $a$ is pivoted to the frame F and offers forked terminals $a'$ that embrace the stems 1 under studs 1' whereby the lower casting and its operative members may be lifted as occasion may demand, such as, in overcoming obstacles, or, when machine is being transported from place to place.

The just described mechanical assembly forms the forward group from which projects, at the machine's longitudinal center, the revolving brush unit whose disc portion covers an area that is certain to include the reaped tops and leaves, and sweep this refuse beyond the path of embedded roots. The throw of the brush has been determined to be forward of the far rear traction-wheel, of Fig. 1, and a guard-bar $x$ is projected rearwardly from the side member of the frame F which buffets the tossed leavage so that same will not find a way into the wheel-spokes, where they would become a tangled mass that might build up sufficiently to offer delaying hindrance.

About the center of the framework's either side-bar is pivoted a bifurcated plow assembly, whose arms 25 extend back and curve downwardly to offer soil-penetrating shares 25'. These shares are spaced apart and form separate points that lie parallel to each other and flank the line of embedded roots with rearwardly extended elements 25'' forming ways over which the beet-roots are rolled by the throwout 29. The arms 25 are connected together at the curvature of each and fashioned also at this point to offer bearings for a transverse shaft 26, which rotates by virtue of the sprocket 27 keyed thereto in the same plane as is a sprocket 28 upon the shaft 4. A free-spoked wheel, or throwout 29 is keyed to the shaft 26 and revolves to kick out the beet-roots unearthed by the plow shares 25', leaving said roots where they can be readily gathered, or, as is contemplated, the throwout 29 may be utilized for throwing the roots into a receiving apron which may form the mouth of some kind of conveyor means leading to carriers.

The motor shaft 30 is equipped with a sprocket 30' which is in a similar plane as is the sprocket 8 and suitable chain means connect up the said motor to the driving transverse shafts 4 and 26 for actuating the mechanism above described.

Having described the invention, what is claimed and desired to protect by United States Letters Patent, is:

1. In a beet-topper the combination of a power driven assembly supported upon a portable framework comprising; a transverse ground-contacting forward roller; a transversely reciprocative cutting blade; adjustable means for fixedly regulating the relationship between the said roller and said blade; resilient means for cushioning a common vertical freedom in the aforesaid roller and blade; a circular ground-sweeping brush behind and spacedly separate from said blade; said brush adapted to rise and fall independently of the roller and blade in accordance with the beet-row harvested; and singular means for lifting, in unison, the said roller, blade, and brush into an inoperative position.

2. In a beet topping machine the combination of; a forwardly positioned power source; a portable frame having parallel side bars, a spacing element offering sleeved guides, and shaft bearings, and determining the fixed position of said bars; resiliently maintained reciprocative stems journalled inclinedly in the sleeved guides aforesaid; a transverse roller; a transversely reciprocative cutter; a circular rotative brush inclined with respect to the traversed ground; said roller, cutter, and brush disposed in the operative order recited; the said roller and said cutter disposed to rise and fall with the resiliently maintained stems aforesaid; the said brush disposed to rise and fall independently; and gearing elements for transmitting operative action from the aforesaid power source to affect the said roller, the said cutter and the said brush in unison.

3. A beet topping machine having, a portable frame including a forwardly disposed power source and a transverse guiding member, vertical stems reciprocatable in said member, a transverse roller rotatably geared, said roller adapted to reciprocate irregularly in unison with the said vertical stems, a transverse gear shaft flexibly connected to the said power source, outboard shaft means automatically reciprocative vertically, said outboard shaft means providing positive and continued gear connection between the aforesaid transverse shaft and the irregularly reciprocating transverse roller, a centrally disposed and vertically floating shaft geared to the transverse shaft, transverse reciprocating means driven by the centrally disposed shaft including a transversely actuated cutter, a vertically inclined shaft supporting a rotative brush element, fixed gear means about said floating shaft and about said vertically inclined shaft meshed to impart rotation to said brush, and means whereby the brush aforesaid and the cutter aforesaid may rise and fall independently of each other.

In testimony of which I hereto affix my signature.

STANLEY F. PARKER.